US012789086B2

(12) United States Patent
Risser

(10) Patent No.: US 12,789,086 B2
(45) Date of Patent: *Nov. 10, 2026

(54) METHOD AND SYSTEM FOR AUTOMATIC NORMAL MAP DETECTION AND CORRECTION

(71) Applicant: Unity Technologies ApS, Copenhagen (DK)

(72) Inventor: Eric Andrew Risser, Dublin (IE)

(73) Assignee: Unity Technologies ApS, Copenhagen (DK)

( * ) Notice: Subject to any disclaimer, the term of this patent is extended or adjusted under 35 U.S.C. 154(b) by 133 days.

This patent is subject to a terminal disclaimer.

(21) Appl. No.: 18/820,198

(22) Filed: Aug. 29, 2024

(65) Prior Publication Data

US 2025/0099858 A1 Mar. 27, 2025

Related U.S. Application Data

(63) Continuation of application No. 17/666,447, filed on Feb. 7, 2022, now Pat. No. 12,102,923.

(60) Provisional application No. 63/146,350, filed on Feb. 5, 2021.

(51) Int. Cl.

*A63F 13/52* (2014.01)
*A63F 13/69* (2014.01)
*G06T 11/60* (2026.01)

(52) U.S. Cl.

CPC .............. *A63F 13/52* (2014.09); *A63F 13/69* (2014.09); *G06T 11/60* (2013.01)

(58) Field of Classification Search

CPC ........................................................ G06T 11/06
See application file for complete search history.

(56) References Cited

U.S. PATENT DOCUMENTS 12,102,923 B2 10/2024 Risser
2010/0049052 A1 2/2010 Sharf et al.
2012/0287247 A1* 11/2012 Stenger ................ H04N 13/128 348/47
2013/0148851 A1* 6/2013 Leung ....................... G06T 7/74 382/103
2015/0302643 A1 10/2015 Miller
2018/0025235 A1 1/2018 Fridman
(Continued)

OTHER PUBLICATIONS

U.S. Appl. No. 17/666,447, 312 Amendment filed Jun. 7, 2024, 8 pgs.
(Continued)

*Primary Examiner* — Kee M Tung
*Assistant Examiner* — Khoa Vu
(74) *Attorney, Agent, or Firm* — Schwegman Lundberg & Woessner, P.A.

(57) ABSTRACT

A method of determining an authenticity of a normal map is disclosed. An input candidate normal map is received. A reconstructed candidate normal map is generated based on a performance of a mathematical differentiation on an integration of the input candidate normal map. A reconstruction error is determined based on a comparison of the input candidate normal map to the reconstructed candidate normal map. An authenticity of the input candidate normal map is determined based on the reconstruction error being within a configurable threshold.

20 Claims, 10 Drawing Sheets
(3 of 10 Drawing Sheet(s) Filed in Color)

(56) References Cited

U.S. PATENT DOCUMENTS

| | | | | |
|---|---|---|---|---|
| 2019/0051056 | A1 | 2/2019 | Chiu et al. | |
| 2019/0349598 | A1* | 11/2019 | Aminlou .............. | H04N 19/105 |
| 2022/0028139 | A1 | 1/2022 | Mitra et al. | |
| 2022/0249955 | A1 | 8/2022 | Risser | |
| 2022/0284332 | A1 | 9/2022 | Hashimoto et al. | |
| 2022/0318559 | A1 | 10/2022 | Shen et al. | |

OTHER PUBLICATIONS

U.S. Appl. No. 17/666,447, Examiner Interview Summary mailed May 1, 2024, 2 pgs.
U.S. Appl. No. 17/666,447, Non Final Office Action mailed Nov. 9, 2023, 18 pgs.
U.S. Appl. No. 17/666,447, Notice of Allowance mailed May 30, 2024, 9 pgs.
U.S. Appl. No. 17/666,447, PTO Response to Rule 312 Communication mailed Jun. 13, 2024, 3 pgs.
U.S. Appl. No. 17/666,447, Response filed May 9, 2024 to Non Final Office Action mailed Nov. 9, 2023, 11 pgs.

* cited by examiner

METHOD AND SYSTEM FOR AUTOMATIC NORMAL MAP DETECTION AND CORRECTION

CROSS-REFERENCE TO RELATED APPLICATIONS

This application is a continuation of and claims the benefit of priority under 35 U.S.C. § 120 to U.S. patent application Ser. No. 17/666,447, filed on Feb. 7, 2022, which claims the benefit of U.S. Provisional Application No. 63/146,350, filed Feb. 5, 2021, entitled "METHOD AND SYSTEM FOR AUTOMATIC NORMAL MAP DETECTION AND CORRECTION," each of which is incorporated by reference herein in its entirety.

TECHNICAL FIELD

The subject matter disclosed herein generally relates to the technical field of computer system graphics, and, in one specific example, to computer systems and methods for an automatic detection of a normal map.

BACKGROUND OF THE INVENTION

Normal maps encode local surface shape information at pixels in a texture. They are used in computer rendering so that materials may interact correctly with light so that they are shaded with a 3D appearance. However, the use of normal maps is riddled with a number of challenges for novice and experienced artists alike, partially due to their unintuitive nature and partially due to their lack of industry wide standards. Incorrect usage of normal maps is the cause of many bugs in material systems during content creation; for example, it is common for a creator to copy, paste, or blend patches of source material data into new arrangements wherein normal maps are naively rotated and become functionally broken. Industry software does not correctly identify normal maps or their tangent space and thus require humans to correctly specify these elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of example embodiments of the present disclosure will become apparent from the following detailed description, taken in combination with the appended drawings, in which.

DETAILED DESCRIPTION

Figure 1:
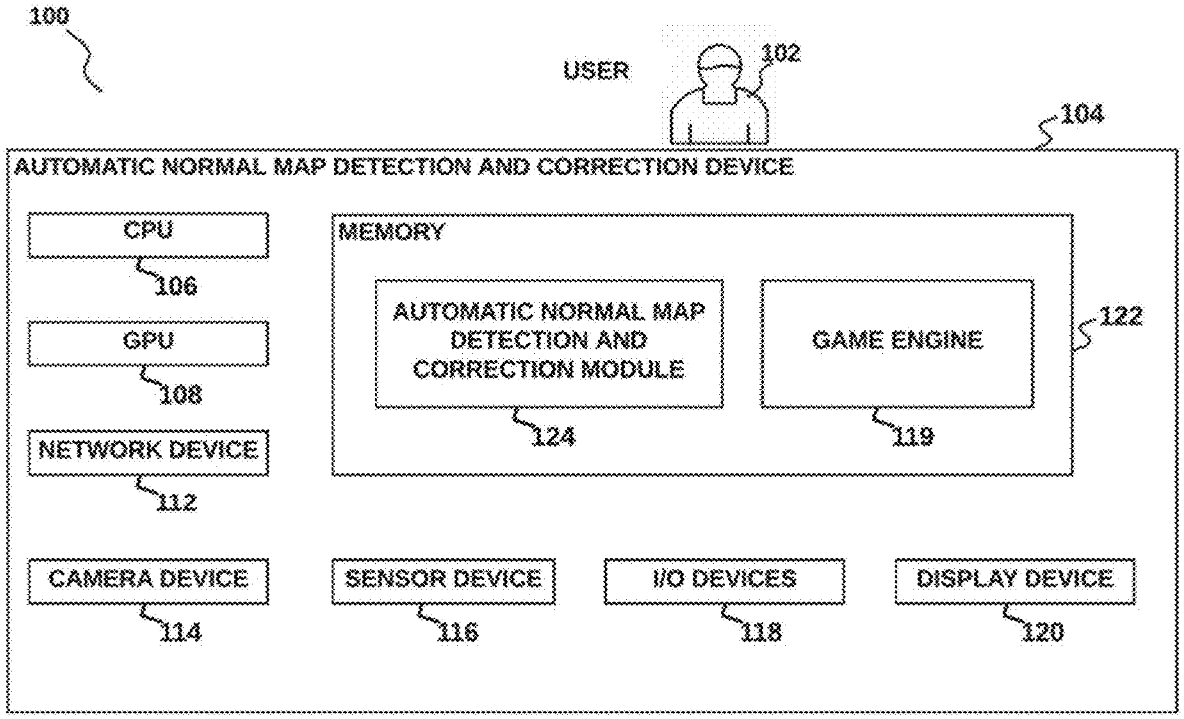
FIG. 1 is a schematic illustrating a normal map automatic detection and correction system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any digital object or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime.

The systems and methods described herein include one or more components or operations that are non-routine or unconventional individually or when combined with one or more additional components or operations, because, for example, they provide a number of valuable benefits to at least content creators or software developers. For example, the systems and methods described herein can detect whether an image is an authentic normal map (e.g., as described in the method 200), and based on the image being an authentic normal map, further detect whether the image is in a known normal map format such as the DirectX™ or OpenGL™ tangent space (e.g., see operation 212 in the method 200). In addition, the systems and methods described herein can fix rotation errors for normal maps that are incorrectly rotated or flipped (e.g., in image editing software) (e.g., see operation 214 of the method 200).

A normal map encodes data describing a local surface shape at any pixel in a texture and allows a material to interact correctly with light during a rendering of a scene or image (e.g., in order so that the material is shaded with a 3D appearance). However, normal maps are riddled with a number of challenges for novice and experienced artists alike, partially due to their unintuitive nature and partially due to a lack of industry wide standards. Incorrect usage of normal maps is a cause of many bugs in material systems in computer graphics. Currently, a human operator must correctly identify a normal map and/or an associated tangent space (e.g., wherein a tangent space may represent a proprietary normal map format). The automation of normal map and associated tangent space identification (e.g., during a material creation process) with the use of the systems and methods described herein may provide a significant improvement, such as an efficiency, usability, or performance improvement, for anyone working with the materials, and may also significantly reduce human error involved in the process.

In example embodiments, a method of determining an authenticity of a normal map is disclosed. An input candidate normal map is received. A reconstructed candidate normal map is generated based on a performance of a mathematical differentiation on an integration of the input candidate normal map. A reconstruction error is determined based on a comparison of the input candidate normal map to the reconstructed candidate normal map. An authenticity of the input candidate normal map is determined based on the reconstruction error being within a configurable threshold.

Turning now to the drawings, systems and methods, including non-routine or unconventional components or operations, or combinations of such components or operations, for automatic detection and correction of normal maps in accordance with embodiments of the invention are illustrated. In example embodiments, FIG. 1 is a diagram of an example normal map automatic detection and correction system 100 and associated devices configured to provide normal map automatic detection and correction system functionality (e.g., to a user 102). In the example embodiment, the normal map automatic detection and correction system 100 includes a normal map automatic detection and correction device 104, operated by a user 102. In some embodiments, the normal map automatic detection and correction device 104 is a mobile computing device, such as a smartphone or a tablet computer. In other embodiments, the normal map automatic detection and correction device 104 is a computing device such as a desktop computer. In some embodiments, the normal map automatic detection and correction device 104 is a computing device capable of providing a mixed reality experience to the user 102.

In the example embodiment, the normal map automatic detection and correction device 104 includes one or more central processing units (CPUs) 106 and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein in reference to FIG. 2, FIG. 3, FIG. 4, FIG. 5, FIG. 6, FIG. 7A, and FIG. 7B. The normal map automatic detection and correction device 104 may also include one or more networking devices 112 (e.g., wired or wireless network adapters) for communicating across a network (e.g., a cellular network, a Wi-Fi network, the Internet, and so forth). The normal map automatic detection and correction device 104 may further include one or more camera devices 114 which may be configured to capture digital video of the real world (e.g., near the user 102) during operation. The normal map automatic detection and correction device 104 may also include one or more sensors 116, such as a global positioning system (GPS) receiver (e.g., for determining a GPS location of the normal map automatic detection and correction device 104), biometric sensors (e.g., for capturing biometric data of the user 102), motion or position sensors (e.g., for capturing position data of the user 102 or other objects), and an audio microphone (e.g., for capturing sound data). Some sensors 116 may be external to the normal map automatic detection and correction device 104, and may be configured to wirelessly communicate with the normal map automatic detection and correction device 104 (e.g., such as used in the Microsoft Kinect®, Vive Tracker™, MIT's Lidar sensor, or MIT's wireless emotion detector).

In the example embodiment, the camera device 114 and sensors 116 capture data from a surrounding environment, such as video, audio, depth information, GPS location, and so forth. The client module 124 may be configured to analyze the sensor data directly, or analyze processed sensor data (e.g., a real-time list of detected and identified objects, object shape data, depth maps, and the like).

The normal map automatic detection and correction device 104 also includes one or more input devices 118 such as, for example, a keyboard or keypad, a mouse, a pointing device, a touchscreen, a hand-held device (e.g., hand motion tracking device), a microphone, a camera, and the like, for inputting information in the form of a data signal readable by the processing device 106. The normal map automatic detection and correction device 104 further includes one or more display devices 120, such as a touchscreen of a tablet or smartphone, or lenses or visor of a VR or AR HMD, which may be configured to display virtual objects to the user 102 in conjunction with a real world view.

The normal map automatic detection and correction device 104 also includes a memory 122 configured to store a normal map automatic detection and correction module 124. The memory 122 can be any type of memory device, such as random access memory, read only or rewritable memory, internal processor caches, and the like. During operation, the normal map automatic detection and correction module 124 performs the various normal map automatic detection and correction functionalities as described herein in reference to FIG. 2, FIG. 3, FIG. 4, FIG. 5, FIG. 6, FIG. 7A, and FIG. 7B. In accordance with an embodiment, the memory may also store a game engine 119 (e.g., executed by the CPU 106 or GPU 108) that communicates with the display device 120 and also with other hardware such as the input/output device(s) 118 to present a 3D environment (e.g., a virtual reality environment, a mixed reality environment, and the like) to the user 102. The game engine would typically include one or more modules that provide the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be decoupled, each being performed independently and concurrently, such that the rendering step always uses a recent state of the virtual environment and current settings of the virtual scene to generate a visual representation at an interactive frame rate and, independently thereof, the simulation step updates the state of at least some of the digital objects (e.g., at another rate).

Figure 2:
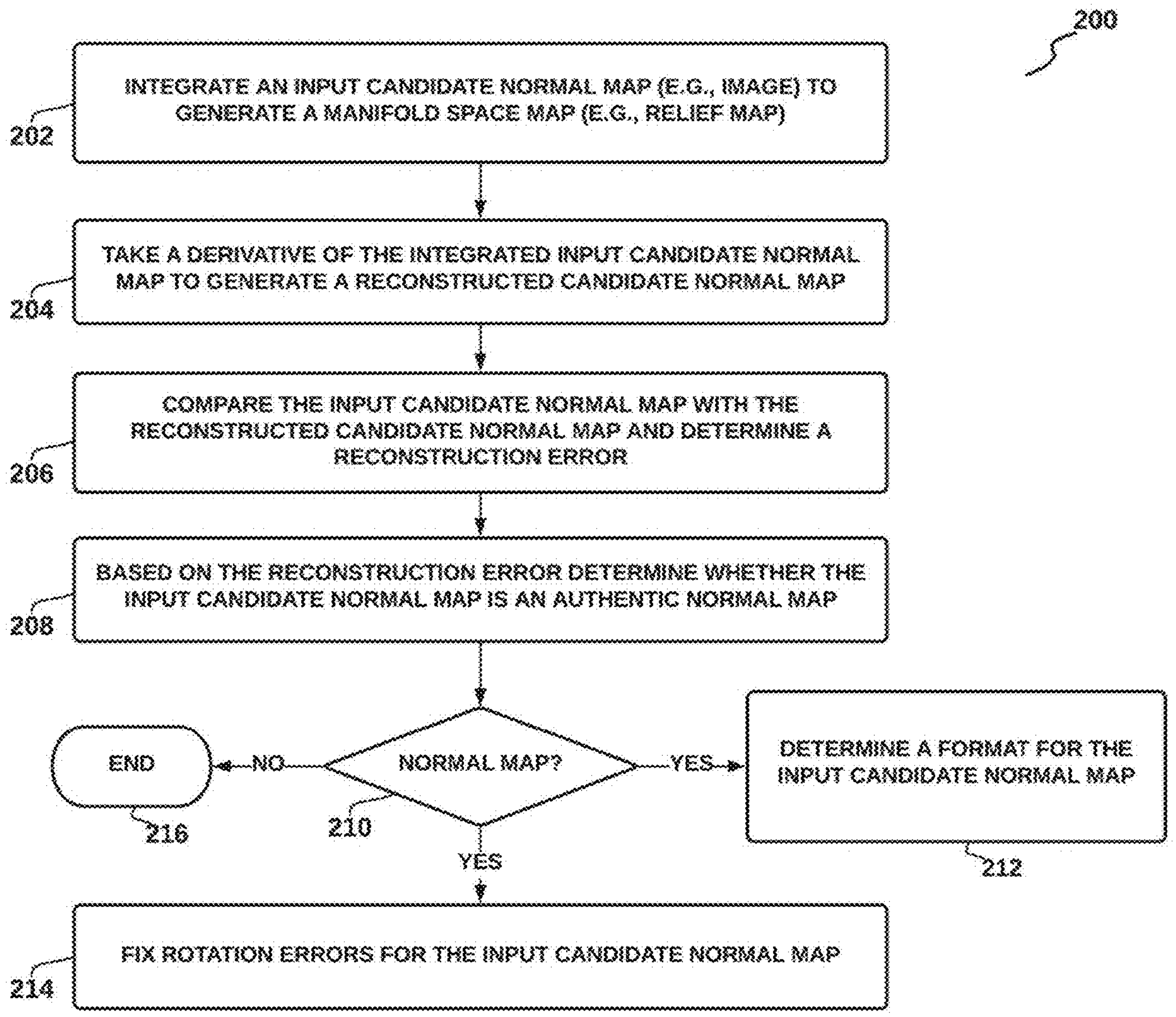
FIG. 2 is a flowchart of a method for the automatic detection and correction of normal maps using a normal map automatic detection and correction system, in accordance with one embodiment.
Figure 5:
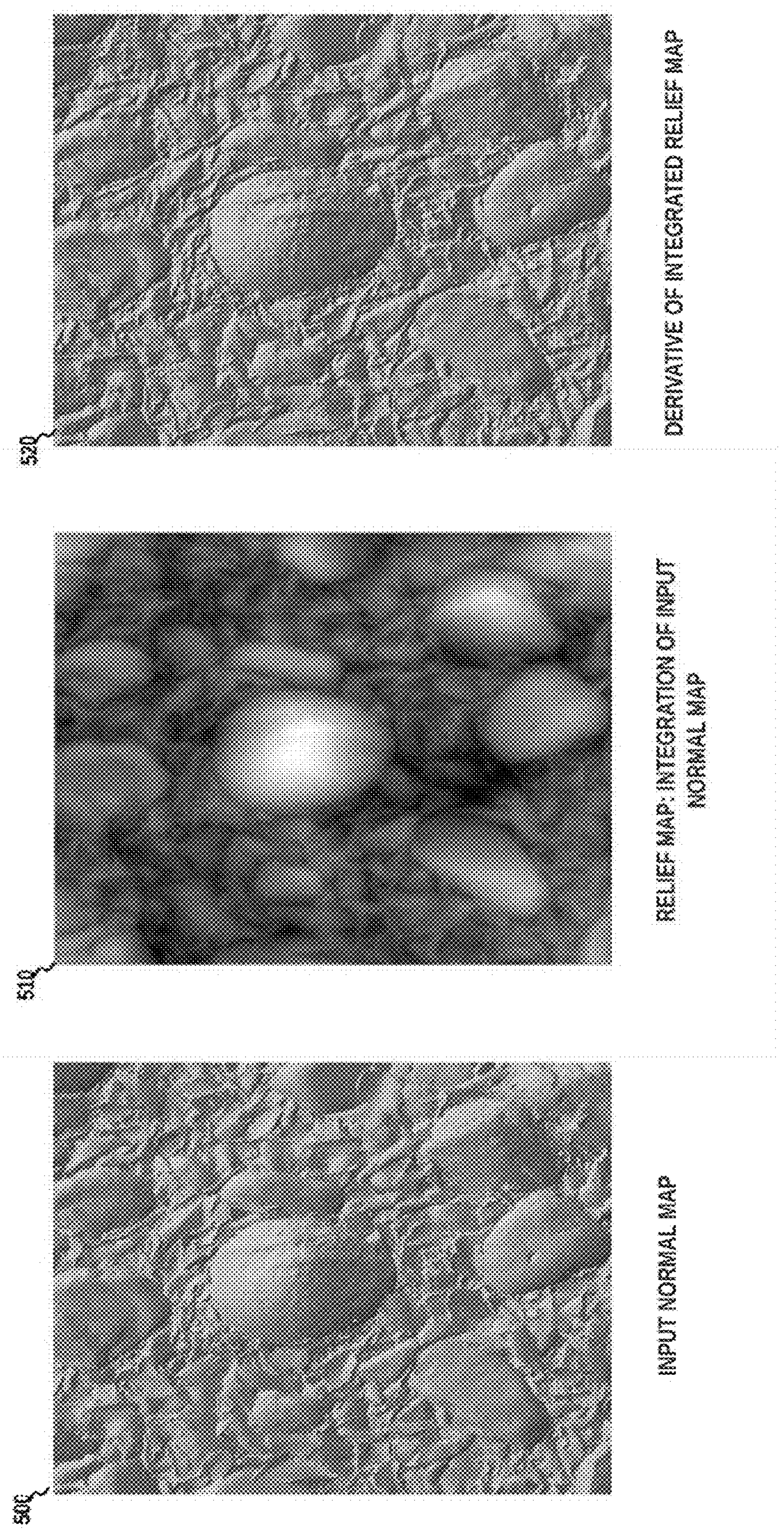
FIG. 5 is a schematic illustration of an input normal map, an integration of the normal map, and a derivative of the integrated normal map, in accordance with an embodiment.

In accordance with an embodiment, and shown in FIG. 2 is a flowchart of a method 200 for the automatic detection and correction of normal maps. The method 200 may be used in conjunction with the normal map automatic detection and correction system 100 as described with respect to FIG. 1. In various embodiments, some of the method elements shown may be performed concurrently, in a different order than shown, or may be omitted. The method 200 utilizes an assumption that a normal map encodes a differential of a continuous manifold (e.g., a topological space including relief maps), and so an integration of the normal map will produce the manifold (e.g., relief map), and subsequent differentiation of the manifold (e.g., relief map) will regenerate the normal map (e.g., as shown in FIG. 5 and described below). In accordance with an embodiment, the method 200 uses errors generated during the integration and derivation process as a metric for determining normal map authenticity (e.g., determining whether an input candidate normal map includes normal map information). In accordance with an embodiment, and shown in FIG. 5 is a visual overview of an Input normal map 500, an integration of the input normal map 510 (e.g., relief map), and a derivative of the integrated relief map 520 which resembles the input normal map 500 (e.g., wherein the resemblance signifies an authenticity of the input normal map 500).

In accordance with an embodiment, at operation 202 of the method 200, the normal map automatic detection and correction module 124 integrates (e.g., applying mathematical integration techniques) an input candidate normal map, wherein the input candidate normal map includes data which is being tested for normal map authenticity (e.g., testing whether the input candidate normal map is or is not a normal map, wherein an authentic normal map may include normal map data). In accordance with an embodiment, the integration may include using 2D discrete mathematical integration which may include an iterative multigrid Poisson approach augmented with an adaptive weighting scheme or another integration technique (e.g., based on a configuration choice of a user). The integration may transform the input candidate normal map into a relief map based on the input candidate normal map being an authentic normal map (e.g., wherein the candidate normal map includes normal map data). Based on the input candidate normal map not being a normal map (e.g., not including normal map data), the integration may produce a nonsensical output. In accordance with an embodiment, the input candidate normal map may be in any data format which is consistent with a normal map (e.g., image RGB format containing XYZ normal vector direction information). In accordance with an embodiment, the input candidate normal map may be received from a user, a module, a process or the like along with a request to determine at least the following with respect to the input candidate normal map: a status of being an authentic normal map (e.g., a yes or no determination), a format of the normal map data (e.g., a determination of a proprietary format such as DirectX™ or OpenGL™), and a status of correctness of data orientation (e.g., a determination of a correctness of normal map rotation and/or flipping). In accordance with an embodiment, the integration within operation 202 may be implemented in a manner that is specific (e.g., optimized) to a type of normal map format (e.g., DirectX™ or OpenGL™ format) which may be used in operation 212 to determine a format for the input candidate normal map. For example, the integration may be implemented within a tangent space which is associated with a normal map format. For example, the integration may be implemented with a tangent space specifically associated with the DirectX™ normal map format. Alternatively, the integration may be implemented with a tangent space specifically associated with the OpenGL™ normal map format.

In accordance with an embodiment, at operation 204 of the method 200, the normal map automatic detection and correction module 124 performs a mathematical differentiation (e.g., determining a mathematical derivative) operation on the integrated input candidate normal map output from operation 202. In accordance with an embodiment, the mathematical differentiation may include using a 2D discrete derivative including using a difference quotient on a height value of each pixel in the integrated input candidate normal map with respect to surrounding pixels or another differentiation technique (e.g., based on a configuration choice of a user). In accordance with an embodiment, the output of the differentiation process is referred to herein as a reconstructed candidate normal map.

In accordance with an embodiment, based on the input candidate normal map being an authentic normal map (e.g., including normal map data), the resulting reconstructed candidate normal map should be approximately the same as the input candidate normal map within a reconstruction error threshold (e.g., wherein the reconstruction error threshold includes a small amount of discretization error due to the integration and differentiation process in operations 202 and 204, respectively). In accordance with an embodiment, the reconstruction error may be in a multidimensional format (e.g., a 2D error image wherein each pixel in the error image represents an error value) or a single value (e.g., an averaged value of a higher dimensional error). Accordingly, in operation 206 of the method 200, the normal map automatic detection and correction module 124 compares the input candidate normal map with the reconstructed candidate normal map and determines a reconstruction error. In accordance with an embodiment, the reconstruction error may be determined by comparing normal vectors from the input candidate normal map with normal vectors in the reconstructed candidate normal map (e.g., in a pixel by pixel way). For example, for each pixel position, the dot product may be used to determine a difference angle between a candidate normal vector and a reconstruction normal vector for the pixel position (e.g., taking a dot product between a normal vector in the input candidate normal map at a first pixel position with a normal vector in the reconstructed candidate normal map at the same pixel position and determining an angle between the two vectors by calculating an arc cosine of the dot product). An averaged angular difference (e.g., averaged over all pixel positions) between the input candidate normal map and the reconstructed candidate normal map may be used as the reconstruction error. Other methods of comparing input candidate normal map with the reconstructed candidate normal map may be used to determine a reconstruction error.

The reconstruction error between the input candidate normal map and the reconstructed candidate normal map (e.g., via the method 200) may be interpreted as a quantification of how "correct" the normal map is and is used by the normal map automatic detection and correction module 124 to solve at least the following three open problems involving normal map use in practice: 1) Detecting whether an input image is or is not an authentic normal map (e.g., described operation 208 below); 2) Detecting a normal map format (e.g., tangent-space coordinate frame) for encoding of the normal map (e.g., to determine if the coordinate frame is in DirectX™ format or OpenGL™ format) (e.g., described in operation 212 below); and 3) correcting a normal map that has been rotated or flipped (e.g., incorrectly) in image editing software, and finding new local normal values that reflect the global image rotations (e.g., described operation 214 below).

In accordance with an embodiment, at operation 208 of the method 200, the normal map automatic detection and correction module 124 determines, based on the reconstruction error, whether or not the input candidate normal map is an authentic normal map (e.g., wherein an authentic normal map includes normal map data). In accordance with an embodiment, the determination may be made by comparison of the reconstruction error with a configurable threshold. For example, the input candidate normal map may be determined not be a normal map based on the reconstruction error being above the threshold and the input candidate normal map may be determined to be a normal map based on the reconstruction error being below the threshold. This is because input candidate normal maps which do not contain normal map data generate larger reconstruction errors when compared to input candidate normal maps which do contain normal map data. In accordance with an embodiment, the configurable threshold may be determined as follows: 1) take training data that includes a first set of a plurality of labeled normal maps (e.g., which include normal map data) and a second set of a plurality of labeled RGB textures (e.g., which do not include normal map data and are not considered normal maps) and put both sets through operations 202 to 206 of the method 200, 2) compute a measure (e.g., such as a mean and standard deviation) of a reconstruction error for each set (e.g., a mean and standard deviation for the plurality of labeled normal maps and a mean and standard deviation for the plurality of RGB textures), and 3) compare the measures (e.g., compare the mean and standard deviation for the two sets) and determine a threshold that can differentiate between the two. For example, based on an assumption that values outside three standards of deviation away from a mean do not belong to a category, then any threshold beyond 3 standard deviations may be used to distinguish an authentic normal map from one that is not. There exists a significant difference between a reconstruction error of a normal map and a reconstruction error of a random image that is not a normal map. For example, many normal maps have an average reconstruction error of 0.244 radians with a standard deviation of 0.139 radians whereas non-normal maps may have an average reconstruction error of 1.202 radians with a standard deviation of 0.252 radians. Based on a standard assumption that values outside three standards of deviation away from the mean do not belong to that category, it can be determined that any values below 0.452 are normal maps with a high confidence and any values above 0.661 are non-normal maps with a high confidence and the ambiguous range from 0.452-0.661 may be split with a threshold between the two values.

Determining Normal Map Format

Figure 3:
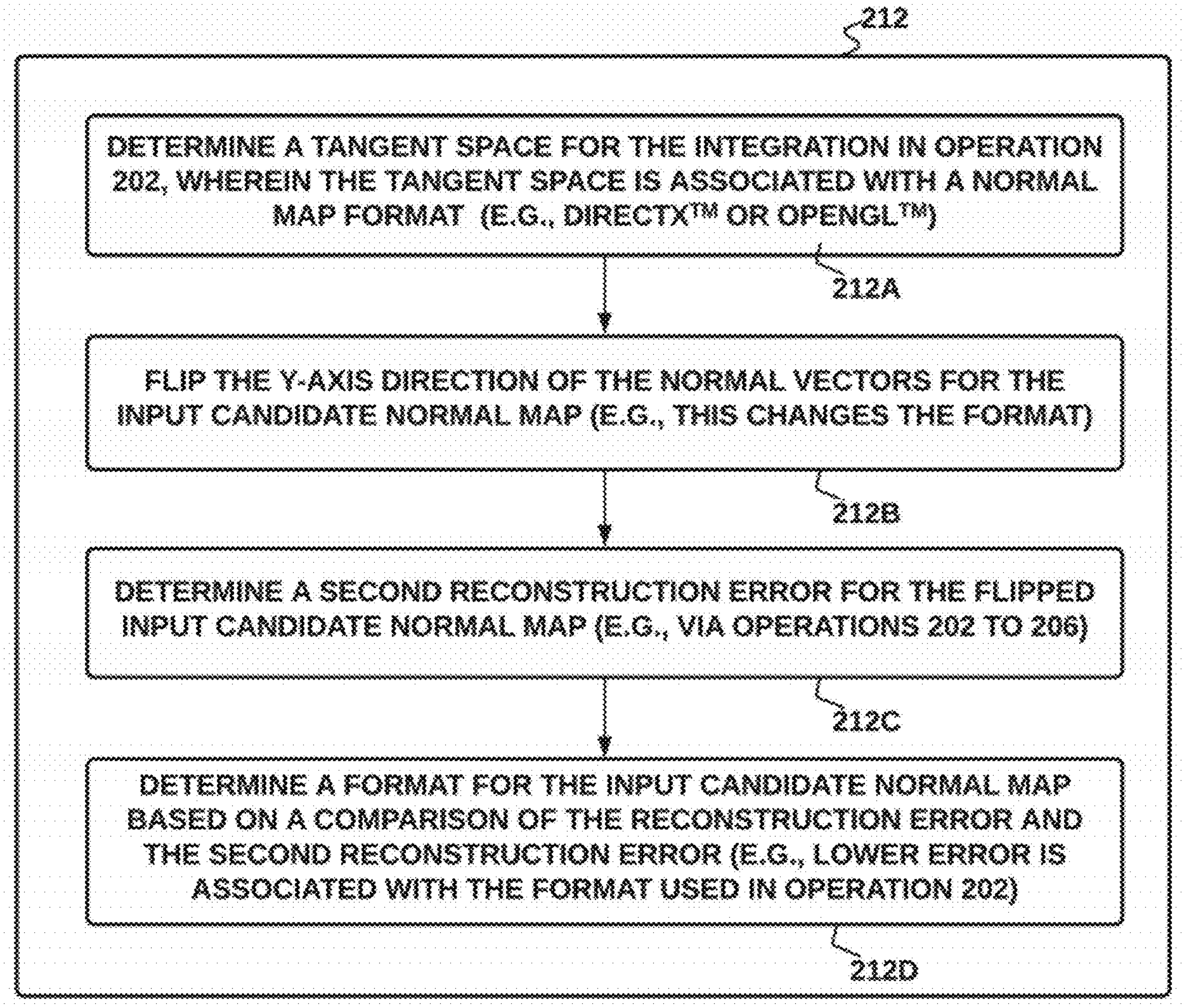
FIG. 3 is a flowchart of a method for determining a format for a normal map using a normal map automatic detection and correction system, in accordance with one embodiment.

In accordance with an embodiment, based on a positive determination of a normal map from operation 210, at operation 212 of the method 200, the normal map automatic detection and correction module 124 determines a normal map format for the input candidate normal map. Some details of operation 212 are shown in FIG. 3. In accordance with an embodiment and shown in FIG. 3, operation 212 may have a plurality of operations. In operation 212A, the normal map automatic detection and correction module 124 determines the integration format used in operation 202 (e.g., DirectX™ or OpenGL™ format). The determination may include a determination of a tangent space used for the integration, wherein the tangent space may be associated with a normal map format. For example, DirectX™ and OpenGL™ may each have their own tangent space which is recognizable (e.g., and distinct from each other). In accordance with an embodiment, at operation 212B, the normal map automatic detection and correction module 124 flips the y-axis direction for normal vectors within the input candidate normal map. The flipping of the y-axis direction causes a conversion between OpenGL™ and DirectX™ normal map formats. In accordance with an embodiment, at operation 212C, the normal map automatic detection and correction module 124 determines a second reconstruction error for the flipped input candidate normal map (e.g., using operations 202 through 206) such that there is a second reconstruction error for the flipped normal map in addition to a reconstruction error for the non-flipped input candidate normal map (e.g., determined at operation 206). In accordance with an embodiment, at operation 212D, the normal map automatic detection and correction module 124 determines a normal map format for the input candidate normal map based on a comparison of the reconstruction error and the second reconstruction error, wherein a map with a smaller reconstruction error from the two reconstruction errors is considered to be in the format associated with the integration format since a normal map in the wrong format will produce a larger reconstruction error than a normal map in the correct format. For example, based on the input candidate normal map being of an OpenGL™ format, and the integration of operation 202 using an OpenGL™ and tangent space, the reconstruction error determined in operation 208 will be less than the second reconstruction error determined in operation 212C (e.g., using the flipped input candidate normal map).

Figure 6:
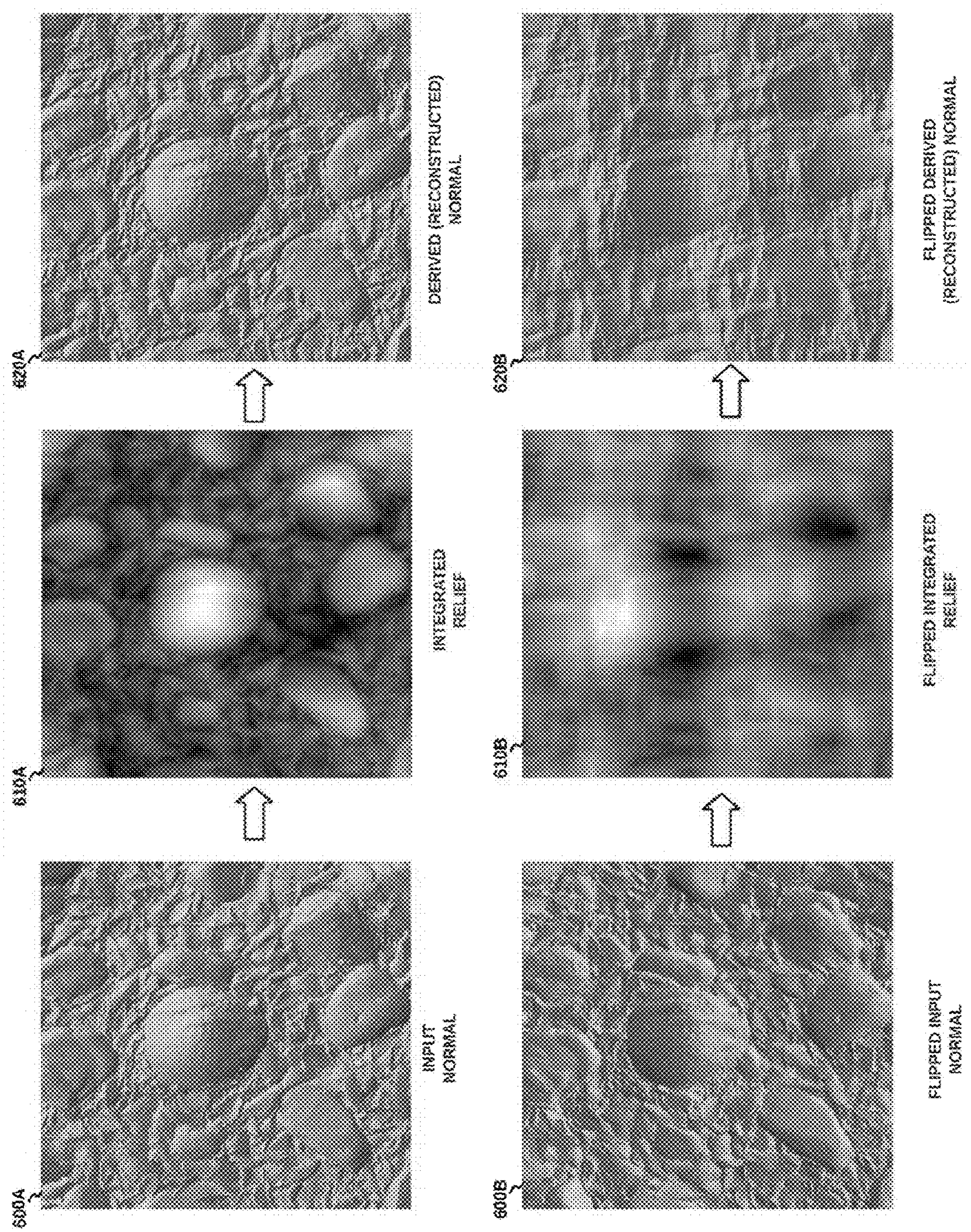
FIG. 6 is a schematic illustration of a normal map and flipped normal map and associated integrated maps and reconstructed normal maps using a normal map automatic detection and correction system, in accordance with an embodiment.

In accordance with an embodiment, FIG. 6 is an illustration of a comparison of a normal map 600A and a flipped version of the normal map 600B with respect to the steps within operation 212. FIG. 6 shows a comparison of an input normal map 600A and a flipped input normal map 600B as they are put through the steps of operation 212. For example, it can be seen that an integrated version 610A of the input normal 600A is visibly different from an integrated version 610B of the flipped input normal 600B, and similarly, a derived (e.g., reconstructed) version 620A of the input normal 600A is visibly different from a derived (e.g., reconstructed) version 620B of the flipped input normal 600B as described in operation 212.

Correcting Normal Map Rotations

Photobashing and Kitbashing workflows involving copy/paste/blending of patches of source data together into new arrangements commonplace among various material authoring disciplines. The workflows allow artists to quickly mix previously existing assets into new configurations. However, many image editing tools used in the workflows do not take into consideration that normal maps are not strictly images; rather they are a data structure for encoding 3D geometry constrained to a planar manifold. It is common for artists to naively rotate normal maps during the workflows and functionally break them.

Figure 4:
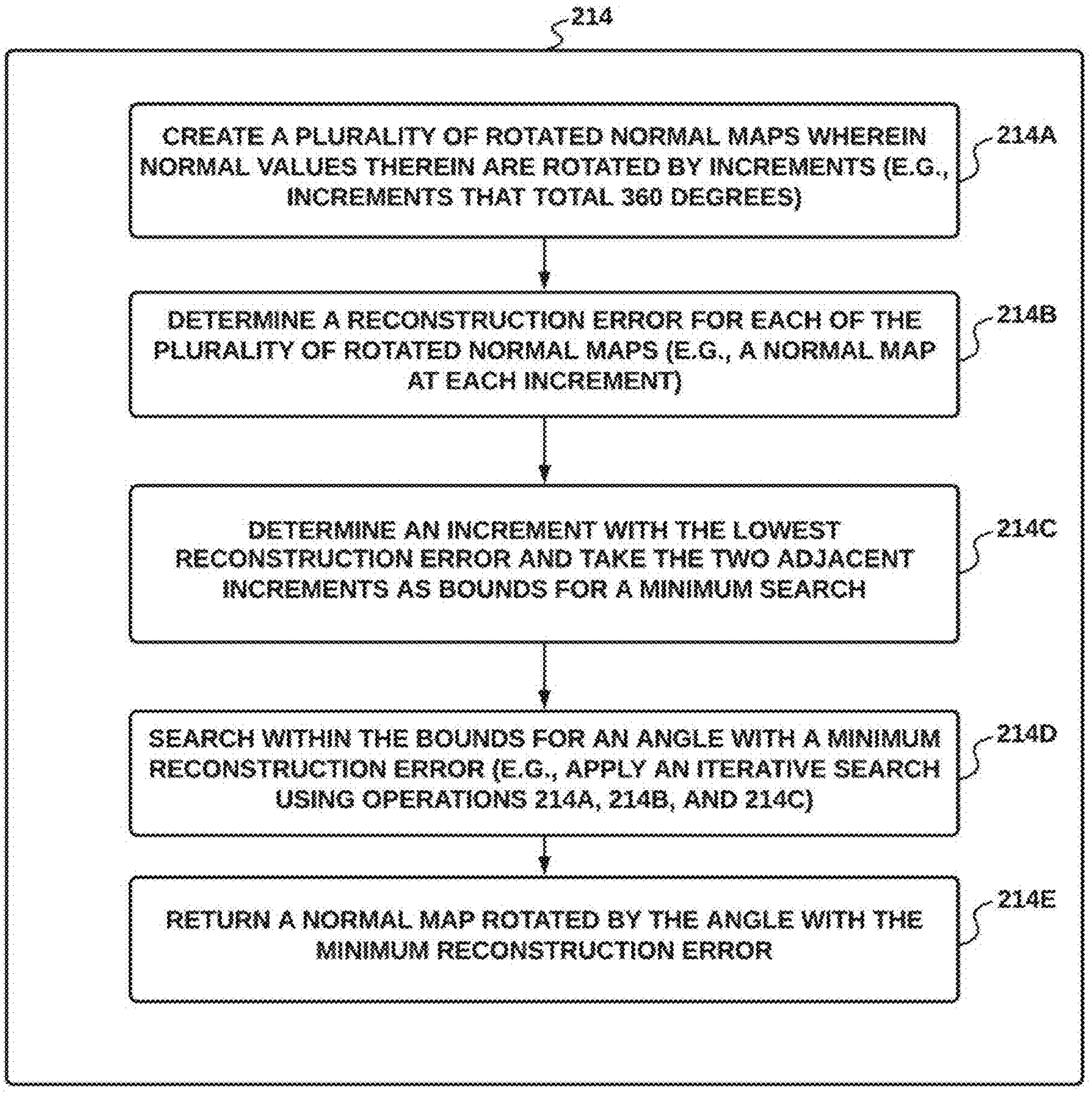
FIG. 4 is a flowchart of a method for correcting a rotation of a normal map using a normal map automatic detection and correction system, in accordance with one embodiment.

In accordance with an embodiment, FIG. 4 shows a method 214 for correcting a rotation of a normal map. The method 214 rotates normal vectors within a normal map so that they become a valid encoding of a planar manifold. In accordance with an embodiment, at operation 214A of the method 214, the normal map automatic detection and correction module 124 takes an input normal map and generates a plurality of rotated normal maps by rotating normal vectors therein by increments (e.g., 45 degree increments) around a full 360 degree circle. In accordance with an embodiment, at operation 214B, the normal map automatic detection and correction module 124 determines a reconstruction error (e.g., by implementing operation 202 to 206) for each of the rotated normal maps created in operation 214A. In accordance with an embodiment, at operation 214C, the normal map automatic detection and correction module 124 determines an angular increment with an associated lowest reconstruction error, and takes two adjacent increments as bounds for a minimum search. In accordance with an embodiment, at operation 214D, the normal map automatic detection and correction module 124 uses the two adjacent increments as an upper and lower bound of a desired optimum minimum angle, and performs a search (e.g., a binary search) between the two, iteratively updating the upper and lower bounds depending on newly determined reconstruction errors (e.g., by reapplying operations 214A, 214B, and 214C within the bounds for each iteration). In accordance with an embodiment, at operation 214E, a corrected normal map may be returned or output to a display device, wherein the corrected normal map is a normal map rotated by the angle with the minimum reconstruction error as determined in operation 214D.

Figure 7A:
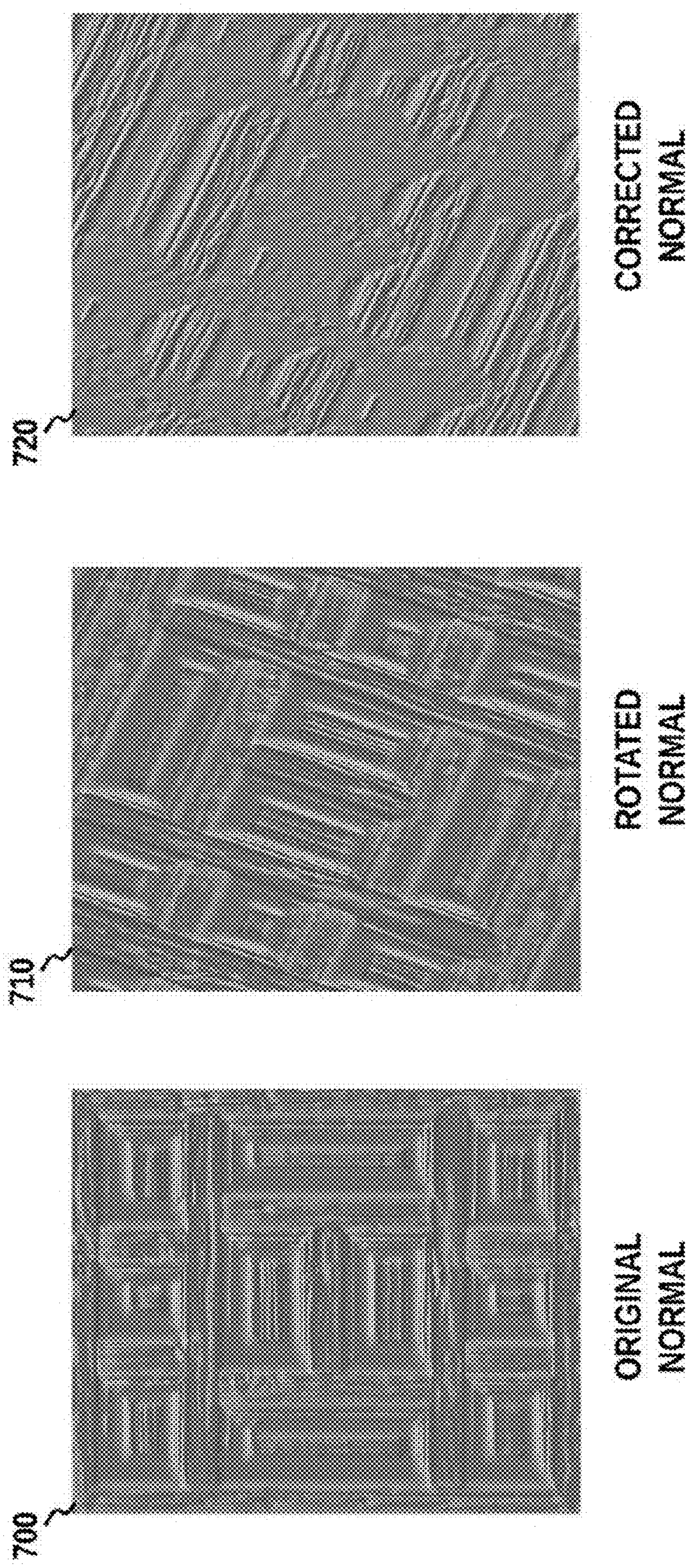
FIG. 7A is a schematic illustration of an incorrectly rotated normal map and a normal map with corrected rotation using a normal map automatic detection and correction system, in accordance with an embodiment.
Figure 7B:
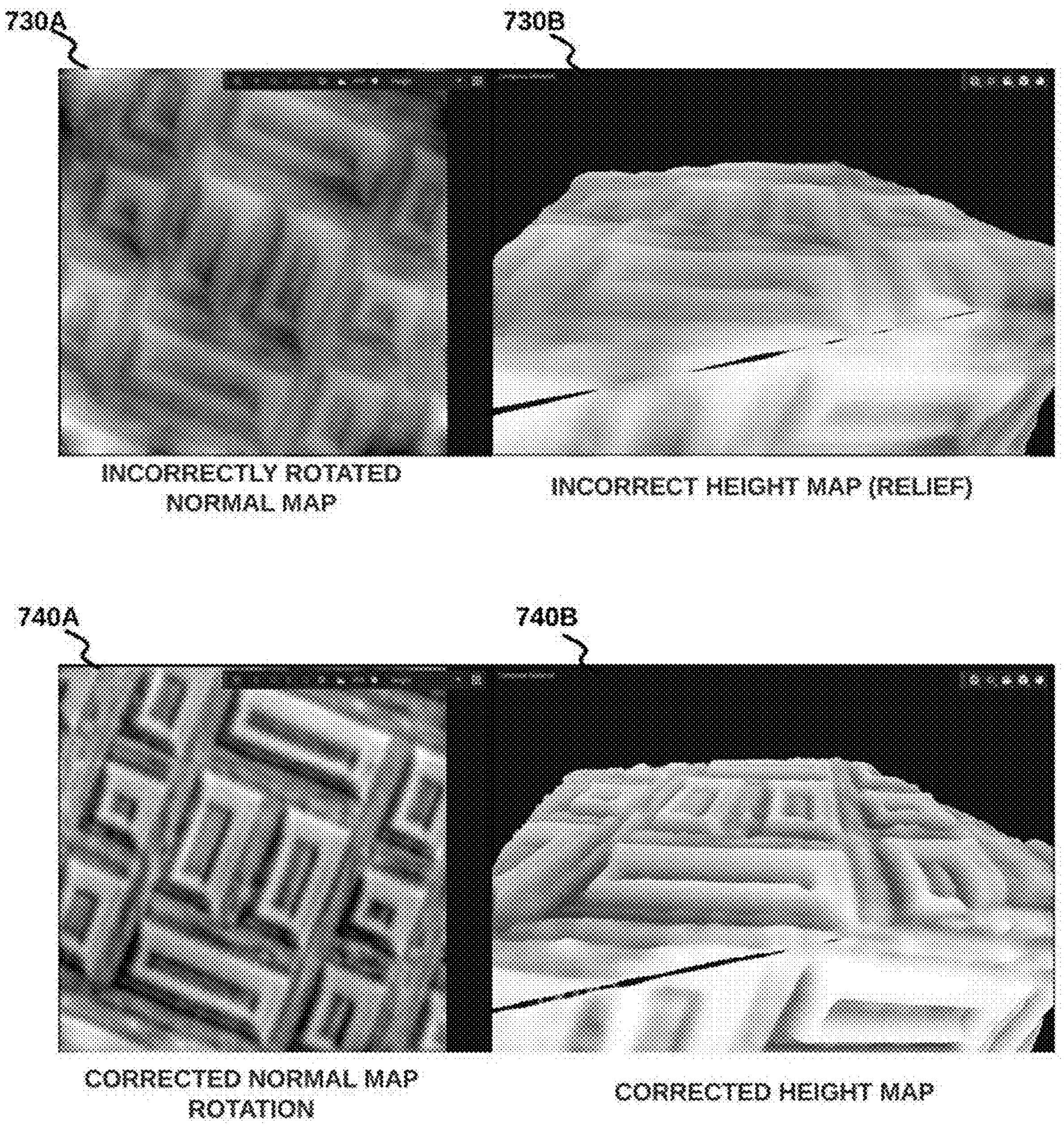
FIG. 7B is a schematic illustration of an incorrectly rotated normal map and resulting incorrect height map as well as a corrected normal map and resulting correct height map using a normal map automatic detection and correction system, in accordance with an embodiment.

In accordance with an embodiment, FIG. 7A shows an original normal map 700, an incorrectly rotated normal map 710 and a corrected normal map 720 as described with respect to operation 214 above. In accordance with an embodiment, FIG. 7B shows an incorrect height map 730B obtained from integrating (e.g., as in operation 202) an incorrectly rotated normal map 730A. In accordance with an embodiment, FIG. 7B also shows a normal map 740A with corrected rotation (e.g., as described in operation 214) and a corrected height map 740B that results from an integration (e.g., as in operation 202) of the normal map 740A with corrected rotation.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (Saas). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 8:
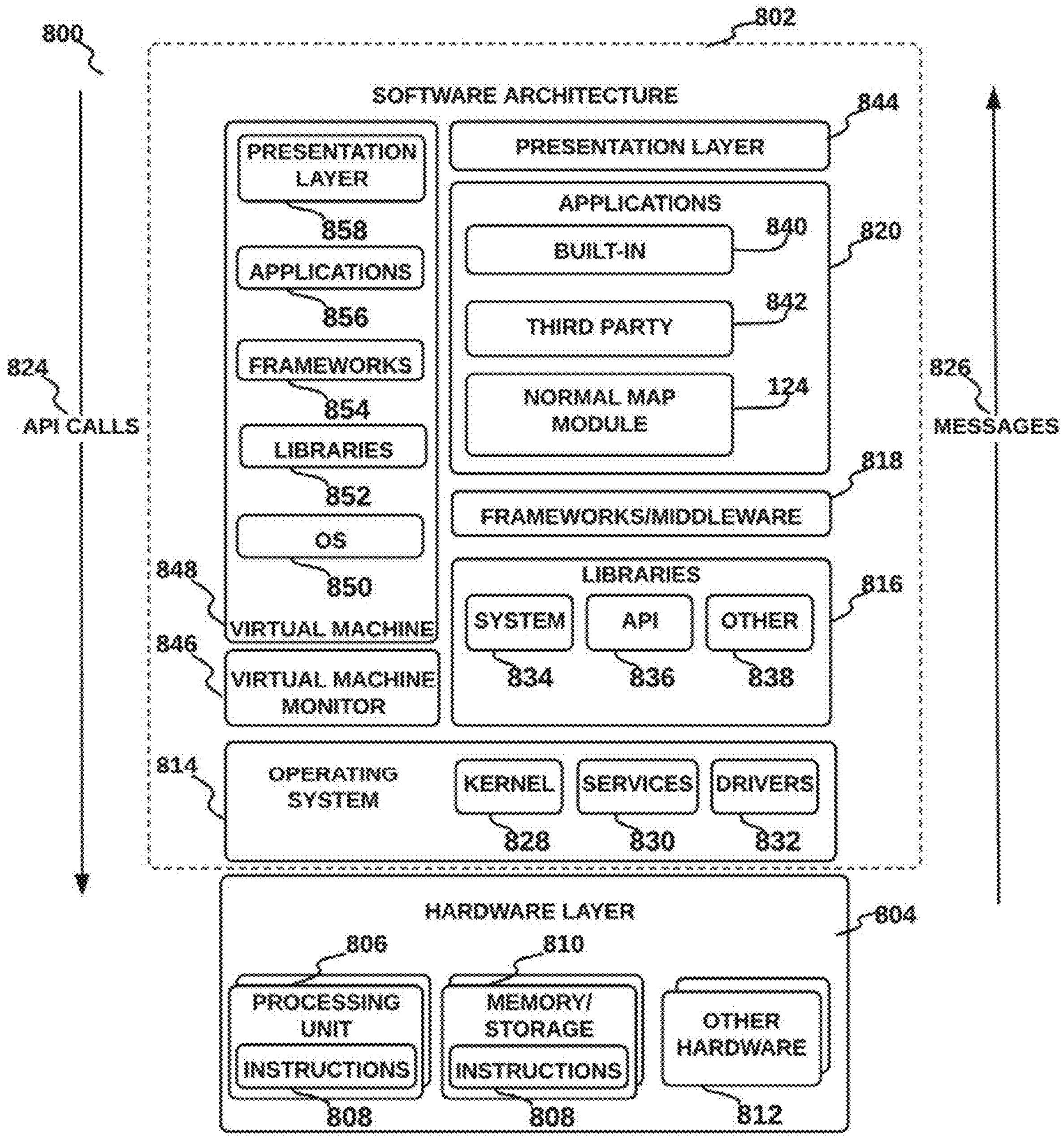
FIG. 8 is a block diagram illustrating an example software architecture, which may be used in conjunction with various hardware architectures described herein.

FIG. 8 is a block diagram 800 illustrating an example software architecture 802, which may be used in conjunction with various hardware architectures herein described to provide a gaming engine 119 and/or components of the automatic normal map detection and correction system 100. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 having associated executable instructions 808. The executable instructions 808 represent the executable instructions of the software architecture 802, including implementation of the methods, modules and so forth described herein. The hardware layer 804 also includes memory/storage 810, which also includes the executable instructions 808. The hardware layer 804 may also comprise other hardware 812.

In the example architecture of FIG. 8, the software architecture 802 may be conceptualized as a stack of layers where each layer provides particular functionality. For example, the software architecture 802 may include layers such as an operating system 814, libraries 816, frameworks or middleware 818, applications 820 and a presentation layer 844. Operationally, the applications 820 and/or other components within the layers may invoke application programming interface (API) calls 824 through the software stack and receive a response as messages 826. The layers illustrated are representative in nature and not all software architectures have all layers. For example, some mobile or special purpose operating systems may not provide the frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be used by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 916 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) provide a higher-level common infrastructure that may be used by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 842 may invoke the API calls 824 provided by the mobile operating system such as operating system 814 to facilitate functionality described herein.

The applications 820 may use built-in operating system functions (e.g., kernel 828, services 830 and/or drivers 832), libraries 816, or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures use virtual machines. In the example of FIG. 8, this is illustrated by a virtual machine 848. The virtual machine 848 creates a software environment where applications/modules can execute as if they were executing on a hardware machine (such as the machine 900 of FIG. 9, for example). The virtual machine 848 is hosted by a host operating system (e.g., operating system 814) and typically, although not always, has a virtual machine monitor 846, which manages the operation of the virtual machine 848 as well as the interface with the host operating system (i.e., operating system 814). A software architecture executes within the virtual machine 848 such as an operating system (OS) 850, libraries 852, frameworks 854, applications 856, and/or a presentation layer 858. These layers of software architecture executing within the virtual machine 848 can be the same as corresponding layers previously described or may be different.

Figure 9:
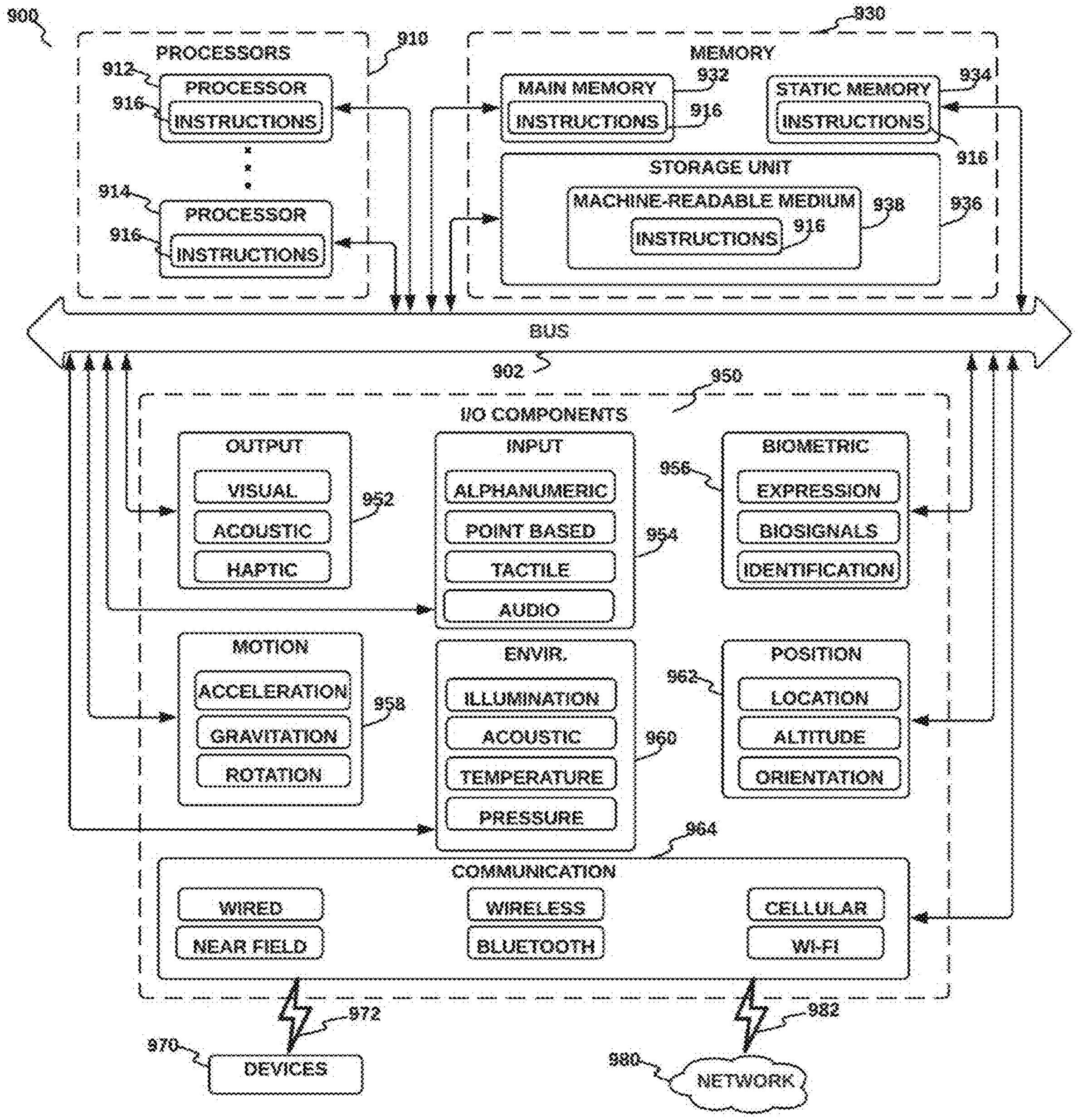
FIG. 9 is a block diagram illustrating components of a machine, according to some example embodiments, configured to read instructions from a machine-readable medium (e.g., a machine-readable storage medium) and perform any one or more of the methodologies discussed herein.

FIG. 9 is a block diagram illustrating components of a machine 900, according to some example embodiments, configured to read instructions from a machine-readable medium (e.g., a machine-readable storage medium) and perform any one or more of the methodologies discussed herein. In some embodiments, the machine 900 is similar to the automatic normal map detection and correction device 104. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. As such, the instructions 916 may be used to implement modules or components described herein. The instructions transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines that individually or jointly execute the instructions 916 to perform any one or more of the methodologies discussed herein.

The machine 900 may include processors 910, memory 930, and input/output (I/O) components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory, such as a main memory 932, a static memory 934, or other memory, and a storage unit 936, both accessible to the processors 910 such as via the bus 902. The storage unit 936 and memory 932, 934 store the instructions 916 embodying any one or more of the methodologies or functions described herein. The instructions 916 may also reside, completely or partially, within the memory 932, 934, within the storage unit 936, within at least one of the processors 910 (e.g., within the processor's cache memory), or any suitable combination thereof, during execution thereof by the machine 900. Accordingly, the memory 932, 934, the storage unit 936, and the memory of processors 910 are examples of machine-readable media 938.

As used herein, “machine-readable medium” means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term “machine-readable medium” should be taken to include a single medium or multiple media (e.g., a centralized or distributed database, or associated caches and servers) able to store the instructions 916. The term “machine-readable medium” shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies or operations, including non-routine or unconventional methodologies or operations, or non-routine or unconventional combinations of methodologies or operations, described herein. Accordingly, a “machine-readable medium” refers to a single storage apparatus or device, as well as “cloud-based” storage systems or storage networks that include multiple storage apparatus or devices. The term “machine-readable medium” excludes signals per se.

The input/output (I/O) components 950 may include a wide variety of components to receive input, provide output, produce output, transmit information, exchange information, capture measurements, and so on. The specific input/output (I/O) components 950 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 950 may include many other components that are not shown in FIG. 9. The input/output (I/O) components 950 are grouped according to functionality merely for simplifying the following discussion and the grouping is in no way limiting. In example various embodiments, the input/output (I/O) components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multidimensional bar codes such as Quick Response (OR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 962, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance.

Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

I claim:

1. A non-transitory computer-readable storage medium storing a set of instructions that, when executed by one or more computer processors, causes the one or more computer processors to perform operations, the operation comprising:

receiving an input candidate normal map;

performing an integration on the input candidate normal map;

generating a reconstructed candidate normal map based on a performing of a differentiation on the integration of the input candidate normal map;

determining a first reconstruction error based on a comparison of the input candidate normal map to the reconstructed candidate normal map; and determining a normal map format for the input candidate normal map, the determining of the normal map format comprising generating a flipped input candidate normal map based on a flipping of the input candidate normal map, determining a second reconstruction error, the second reconstruction error being for the flipped input candidate normal map, and performing a comparison of the first reconstruction error and the second reconstruction error.

2. The non-transitory computer-readable storage medium of claim 1, wherein the input candidate normal map encodes a differential of a manifold, and the integration of the input candidate normal map produces the manifold.

3. The non-transitory computer-readable storage medium of claim 1, wherein the performing of the differentiation includes using a differentiation technique based on a configuration choice of a user.

4. The non-transitory computer-readable storage medium of claim 1, wherein the determining of the first reconstruction error includes comparing normal vectors from the input candidate normal map with normal vectors in the reconstructed candidate normal map.

5. The non-transitory computer-readable storage medium of claim 1, wherein the determining of the normal map format includes determining that the normal map format is associated with a known normal map format.

6. The non-transitory computer-readable storage medium of claim 1, further comprising generating a corrected normal map from the input candidate normal map based on the flipped input candidate normal map.

7. The non-transitory computer-readable storage medium of claim 6, the generating of the corrected normal map further comprising rotating normal vectors within the input candidate normal map so that the normal vectors become a valid encoding of a planar manifold.

8. A system comprising:

one or more computer processors;

one or more computer memories; and a set of instructions incorporated into the one or more computer memories, the set of instructions configuring the one or more computer processors to perform operations, the operations comprising:

receiving an input candidate normal map;

performing an integration on the input candidate normal map;

generating a reconstructed candidate normal map based on a performing of a differentiation on the integration of the input candidate normal map;

determining a first reconstruction error based on a comparison of the input candidate normal map to the reconstructed candidate normal map; and determining a normal map format for the input candidate normal map, the determining of the normal map format comprising generating flipped input candidate normal map based on a flipping of the input candidate normal map, determining a second reconstruction error, the second reconstruction error being for the flipped input candidate normal map, and performing a comparison of the first reconstruction error and the second reconstruction error.

9. The system of claim 8, wherein the input candidate normal map encodes a differential of a manifold, and the integration of the input candidate normal map produces the manifold.

10. The system of claim 8, wherein the performing of the differentiation includes using a differentiation technique based on a configuration choice of a user.

11. The system of claim 8, wherein the determining of the first reconstruction error includes comparing normal vectors from the input candidate normal map with normal vectors in the reconstructed candidate normal map.

12. The system of claim 8, wherein the determining of the normal map format includes determining that the normal map format is associated with a known normal map format.

13. The system of claim 8, further comprising generating a corrected normal map from the input candidate normal map based on the flipped input candidate normal map.

14. The system of claim 13, the generating of the corrected normal map further comprising rotating normal vectors within the input candidate normal map so that the normal vectors become a valid encoding of a planar manifold.

15. A method comprising:
- receiving an input candidate normal map;
- performing an integration on the input candidate normal map;
- generating a reconstructed candidate normal map based on a performing of a differentiation on the integration of the input candidate normal map;
- determining a first reconstruction error based on a comparison of the input candidate normal map to the reconstructed candidate normal map; and
- determining a normal map format for the input candidate normal map, the determining of the normal map format comprising generating a flipped input candidate normal map based on a flipping of the input candidate normal map, determining a second reconstruction error, the second reconstruction error being for the flipped input candidate normal map, and performing a comparison of the first reconstruction error and the second reconstruction error.

16. The method of claim 15, wherein the input candidate normal map encodes a differential of a manifold, and the integration of the input candidate normal map produces the manifold.

17. The method of claim 15, wherein the performing of the differentiation includes using a differentiation technique based on a configuration choice of a user.

18. The method of claim 15, wherein the determining of the first reconstruction error includes comparing normal vectors from the input candidate normal map with normal vectors in the reconstructed candidate normal map.

19. The method of claim 15, wherein the determining of the normal map format includes determining that the normal map format is associated with a known normal map format.

20. The method of claim 15, further comprising generating a corrected normal map from the input candidate normal map based on the flipped input candidate normal map.

* * * * *